(12) United States Patent
Döring

(10) Patent No.: US 12,017,197 B2
(45) Date of Patent: Jun. 25, 2024

(54) METHOD AND APPARATUS FOR THE PRODUCTION OF CHEMICAL COMPOUNDS

(71) Applicant: Andreas Döring, Unterhaching (DE)

(72) Inventor: Andreas Döring, Unterhaching (DE)

(*) Notice: Subject to any disclaimer, the term of this patent is extended or adjusted under 35 U.S.C. 154(b) by 61 days.

(21) Appl. No.: 17/354,746

(22) Filed: Jun. 22, 2021

(65) Prior Publication Data
US 2022/0401912 A1 Dec. 22, 2022

(51) Int. Cl.
*B01J 3/08* (2006.01)
*B01J 19/24* (2006.01)
*C25B 1/04* (2021.01)

(52) U.S. Cl.
CPC ............... *B01J 19/241* (2013.01); *B01J 3/08* (2013.01); *B01J 2219/00051* (2013.01); *B01J 2219/00162* (2013.01); *C25B 1/04* (2013.01)

(58) Field of Classification Search
CPC ............ B01J 19/241; B01J 2219/00051; B01J 2219/00162; B01J 3/08; C25B 1/04
See application file for complete search history.

(56) References Cited

U.S. PATENT DOCUMENTS

| 2001/0029911 | A1* | 10/2001 | Yang | F02B 71/04 |
| | | | | 123/46 E |
| 2005/0142250 | A1* | 6/2005 | Garwood | A23B 4/12 |
| | | | | 426/35 |
| 2017/0108246 | A1* | 4/2017 | Xiang | F04C 18/3564 |

FOREIGN PATENT DOCUMENTS

| ES | 2348062 T3 * | 11/2010 | B01D 3/009 |
| WO | WO-2011106895 A1 * | 9/2011 | C10J 3/00 |

OTHER PUBLICATIONS

ES2348062T3 English Translation (Year: 2010).*

* cited by examiner

*Primary Examiner* — Ellen M McAvoy
*Assistant Examiner* — Chantel Graham
(74) *Attorney, Agent, or Firm* — Laurence A. Greenberg; Werner H. Stemer; Ralph E. Locher

(57) ABSTRACT

The process and apparatus according to the invention allow the production of hydrocarbons and ammonia without the use of catalysts. For this purpose, waste gases containing $CO_2$ or $N_2$ from an upstream process are fed to compression reactors. In addition, hydrogen from an electrolyzer is fed to these reactors to enable hydrogenation of the fed substances. Methane, alcohols and ammonia, for example, can be produced by this process. In order to increase the yield of the process, it is planned to raise the reactant pressure with the aid of a compressor.

19 Claims, 6 Drawing Sheets

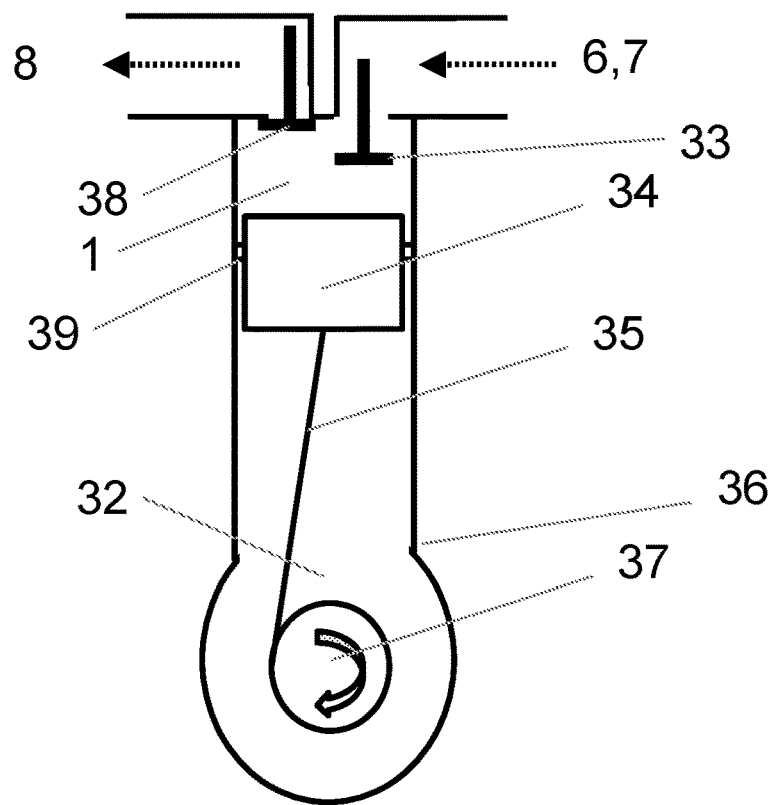
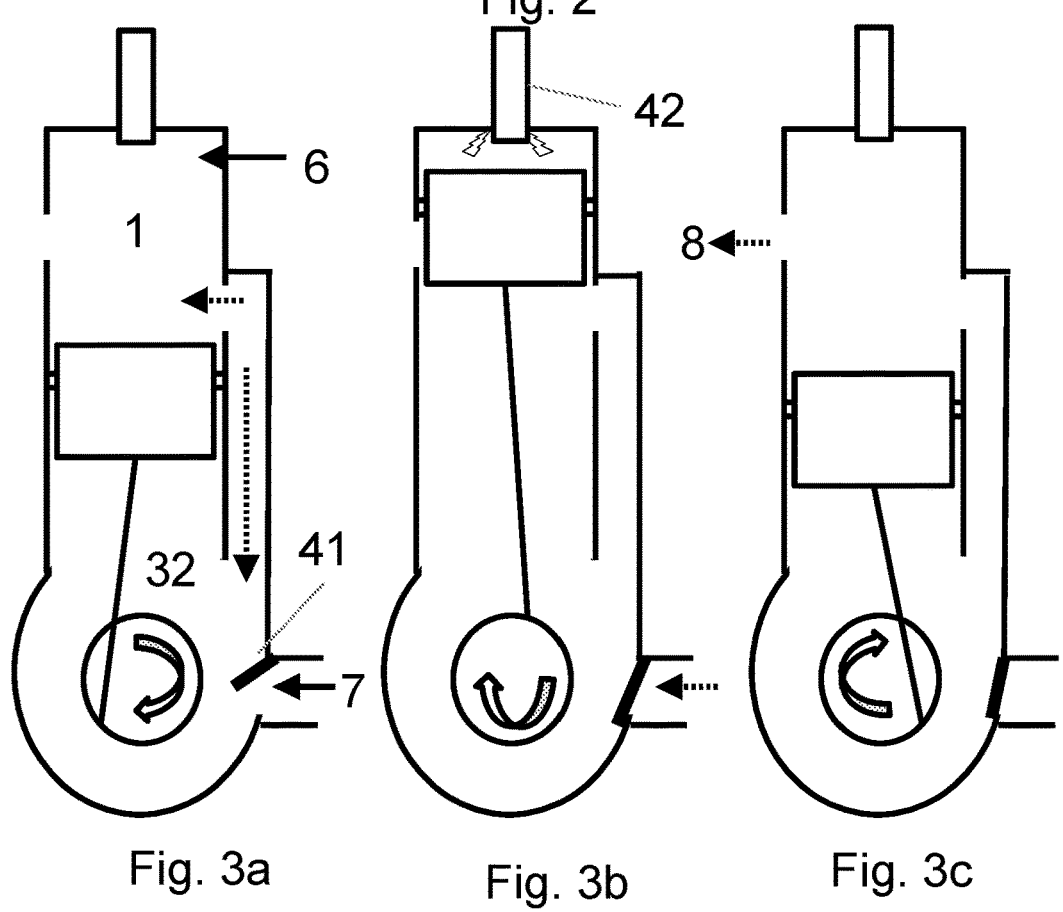
Fig. 2
Fig. 3a    Fig. 3b    Fig. 3c

METHOD AND APPARATUS FOR THE PRODUCTION OF CHEMICAL COMPOUNDS

BACKGROUND OF THE INVENTION

The use of flow and fixed reactors is common in the production of chemical products because they are relatively inexpensive and easy to fabricate. For example, methane, ammonia and methanol are usually produced catalytically in fluidized bed reactors or tubes, especially in fixed bed, fluidized bed or fluidized bed reactors. For instance, methane is produced from CO, $CO_2$ and $H_2$ by the Sabatier process; the same applies to methanol or ethanol, but less hydrogen is added per carbon atom; for the production of $NH_3$ by the Haber Bosch process, $H_2$ and $N_2$ are used. What all the above reactions have in common is that they take place on a technical scale by heterogeneous catalysis on solid catalysts. While catalysts containing zinc are usually used for methanol production, catalysts containing iron are used for the Haber-Bosch process and catalysts containing nickel are used for the Sabatier process. The use of fluidized or fixed-bed reactors is common because they are relatively inexpensive and easy to manufacture. However, there are high requirements for the purity of the reactants CO, $CO_2$, $N_2$ and $H_2$, otherwise the catalysts used will be poisoned and will become inactive. As a result, these substances have to be purified in a complex process before they are fed into the respective catalytic process. This applies in particular to CO and $CO_2$ if they were formed in a process in which inorganic components such as calcium, sodium, vanadium, phosphorus, sulfur or similar were present. This is particularly the case for waste gases from plants for cement production, steel production, lime burning, waste incineration or pyrolysis, especially of plastic waste or internal combustion engines. The disadvantage of this type of reactor is also its difficult controllability and its long start-up times, i.e. it cannot be operated dynamically, especially they can not cope with dynamic changes in the inlet/reactant conditions. In addition, intercooling is necessary due to the strong heat generation of most reactions. If this cooling is not performed, only very low selectivities can be achieved. In addition, due to the catalysts used, the reactors are only designed for one specific reaction and can therefore only be used for this very reaction. So-called pulsed compression reactors represent another possible process control. This type of reactor is generally described, for example, in U.S. Pat. Nos. 8,691,079 B2, 2,814,551, 2,814,552 and in ""Pulsed Compression Technology: A Breakthrough in the Production of Hydrogen", M. Glouchenkov and A. Kronberg, WHEC 16/Jun. 13-16, 2006". The basic idea is that gaseous reactants are fed into a reaction chamber via at least one inlet valve, this gas mixture is then compressed via a piston and thus heated. The desired reaction is initiated by the raised temperature, then the pressure and thus the temperature drop again due to the piston movement, and the products thus generated then leave the reaction chamber via at least one outlet valve. This process is repeated periodically, comparable to an internal combustion engine. The difference, however, is that in internal combustion engines the main focus is on the energy delivered and the exhaust gas is released into the atmosphere, whereas in pulsed compression reactors the goal is to obtain usable products. In this way, temperatures of well over a thousand Kelvin and pressures of several hundred bar can be represented for a short time without placing too high a load on the reactor components, since the subsequent expansion of the gas causes the reaction mixture to cool and thus reduces the component load. In order to utilize the energy dissipated during the expansion, at least two reaction chambers are usually mechanically coupled in such a way that the expansion of one reaction chamber leads to a compression in the second reaction chamber. This can be realized, for example, by a free-piston arrangement (U.S. Pat. No. 8,691,079B2, "Pulsed Compression Technology: A Breakthrough in the Production of Hydrogen," M. Glouchenkov and A. Kronberg, WHEC 16/Jun. 13-16, 2006). A connection of two opposing, counter-rotating pistons, each closing off a reactor chamber, can also be represented (U.S. Pat. No. 2,814,551). In addition, prior art reactors based on reciprocating piston engines that operate as reformers and are used to produce syngas (Lim, Emmanuel G. et al. "The Engine Reformer: Syngas Production in an Engine for Compact Gas-to-Liquids Synthesis." The Canadian Journal of Chemical Engineering 94.4 (2016): 623-635). However, pulsed compression reactors have not been widely used for the following reasons:

1. sealing the reactor enclosure to the outside is essential for toxic, flammable, or explosive mixtures for safety reasons. However, since dynamic seals are used on the piston, this is often not 100% successful, which can lead to environmental hazards.
2. due to friction losses, the expansion work of one reaction chamber is often insufficient to provide enough energy to compress the other chamber by the piston. In U.S. Pat. No. 2,814,551 it is described that in such a case additional gas, usually inert gas, is injected into the reactor chamber to increase the pressure there. This allows the energy available for compression to be increased, but additional valves and compressors are required for this.
3. the process is very difficult to control, since, for example, the frequency of the piston movements and thus the residence time depend on the energy released in the reaction and thus on the amount of reactant or educt supplied.
4. the start of the apparatus must be pneumatic, which requires a large number of valves and complicated piping.
5. often relatively high temperatures and pressures have to be realized to achieve sufficiently high activation energies to start the reaction. This can be disadvantageous with regard to the selectivity of the reaction.
6. since there is no direct control of the start of the reaction, but it is started purely by pressure and temperature, this can occur before the top dead center of the piston, which results in the piston being subjected to a high mechanical load and also being decelerated. The latter point can result in the piston not reaching top dead center at all and the pulsating compression reactor coming to a standstill.

BRIEF SUMMARY OF THE INVENTION

Proceeding from the previously described state of the art, it is an object of the present invention, while avoiding the drawbacks of the known arrangements, to provide a method respectively process as well as an apparatus which produce hydrocarbons, in particular methane and/or alcohols and/or ethers, and/or ammonia. This is achieved by combining a process, which produce carbon-containing compounds with a pulsed compression reactor.

BRIEF DESCRIPTION OF THE DRAWINGS

This object, and other objects and advantages of the present invention, will appear more clearly from the following specification in conjunction with the accompanying schematic drawings:

FIG. 2: Four stroke apparatus according to the invention

FIG. 3*a*: Two stroke apparatus according to the invention during the suction stroke FIG. 3*b*: Two stroke apparatus according to the invention during the reaction phase FIG. 3*c*: Two stroke apparatus according to the invention during the ejection stroke

DETAILED DESCRIPTION OF THE INVENTION

Figure 1:
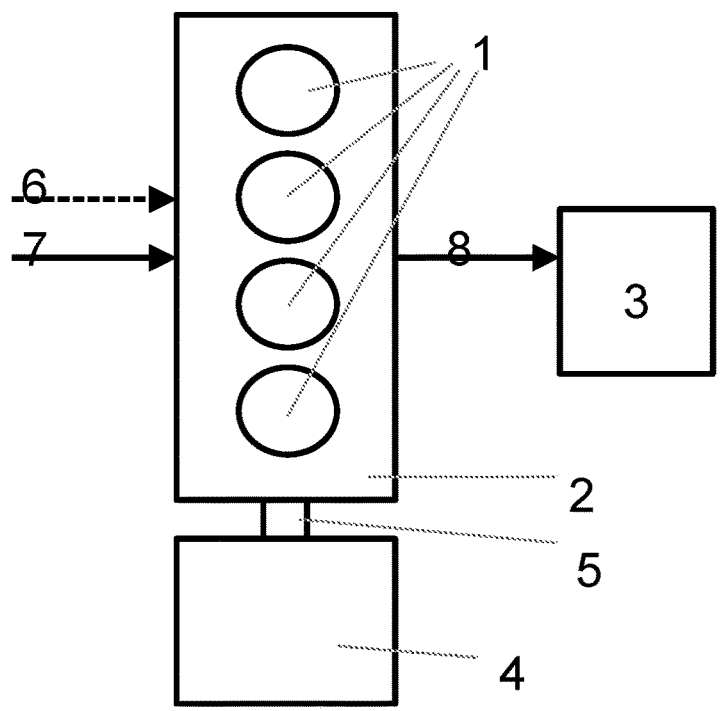
FIG. 1: Apparatus with the compression reactors according to the invention

Pursuant the present application a method or process as well as an apparatus which produce hydrocarbons, in particular methane and/or alcohols and/or ethers, and/or ammonia is provided.

The method respectively process according to the invention solves these topics according to the generic term of claim 1, the apparatus according to the invention solves these problems according to the generic term of claim 19.

According to the invention, it is intended to combine plants or internal combustion engines or reactors, in particular fixed-bed, flow, fluidized-bed, pyrolysis reactors or rotary furnaces, in which carbon-containing compounds, in particular gaseous or liquid compounds, with a carbon oxidation state greater than or equal to −2, such as, for example, HCHO, CO, $CO_2$ being formed with rotary-piston or reciprocating piston compression reactors respectively pulsed compression reactors. In that at least one product produced in the plants or reactors is fed to the rotary-piston or reciprocating-piston reactors and is further processed therein to form at least one other product. If hydrogenation is to take place, hydrogen is additionally fed to the reactor chambers of the compression reactors. With the aid of an electronic control system, which evaluates sensors and/or calculates mathematical models and controls actuators, operating parameters of the compression reactors are determined and influenced in order to optimize the yield and/or selectivity of at least one desired product. For this purpose, actual values obtained via sensors and/or analyzers are compared with setpoint values stored in the electronic control device and operating parameters of the reactors are changed via suitable actuators in such a way that the actual values approximate the setpoint values.

It's preferred according to the invention to change at least one, advantageously at least two, most advantageously at least three operating parameters.

Furthermore, it is provided in accordance with the invention that the maximum yield and/or selectivity of at least one product of the compression reactors is used as the setpoint value and an automated optimization of the operating parameters of the compression reactors is carried out in the electronic control device. This is particularly useful if the quality or composition of the reactants fed to the compression reactors fluctuates, as is the case, for example, when the compression reactors are arranged downstream of reactors for lime burning, cement production, steel production or waste incineration, and the continuous optimization of the operating parameters means that the compression reactors can continue to be operated in their optimum operating range. In other words, the electronic control device continuously re-learns itself. This automated learning is state of the art in neural networks or artificial intelligence, so it will not be discussed further here. In contrast to the prior art, in which different reactors or catalysts must be used for different products, the process respectively method according to the invention and the associated apparatus offer the advantage that the operating parameters of the compression reactors, such as reaction temperature, residence time, reaction pressure, reactant composition, valve opening and valve closing timing, can be changed very rapidly and over a wide range so that a wide variety of products can be produced with the same apparatus.

In reciprocating piston compression reactors, it beneficial according to the invention, that at least two reactor chambers are designed in the form of cylinders and arranged in a row which is revered to as in-line design. A two-row arrangement in the form of so-called banks is also possible, with the two banks being arranged tilted relative to one another at an angle of 40° to 120°, preferably at an angle of 42° to 90°, extremely preferably at an angle of 45° to 60°. In both cases, i.e. the in-line or V-shape design, all pistons moving in the cylinders act on a common crankshaft via a connecting rod in each case. In other words, the design is similar to a reciprocating piston engine or compressor. A device, e.g. an electric machine, is coupled to this crankshaft, via which the speed of the shaft and thus the residence time in the reaction chambers can be changed: If the residence time is to be increased, the crankshaft is decelerated with the aid of the at least one device; if the residence time is to be reduced, the crankshaft is accelerated with the aid of the device, or the braking torque of the device is reduced. Electrical machines used are, for example, commutators, such as DC or single-phase AC motors, or rotating field machines, such as three-phase asynchronous machines, three-phase synchronous machines, single-phase asynchronous motors, single-phase synchronous motors. Electric machines that can be used both as a motor and as a generator are preferable, since they can supply energy to the compression reactor on the one hand, but can also extract energy from it on the other, so that very flexible and dynamic operation is possible. In addition, when the electric machine is used as a generator, the energy to be dissipated during deceleration can be converted into electricity and fed into the power grid or made available to other electrical consumers. When using an electric machine as a motor, the start of the reciprocating compression apparatus is very simple, because for this case the crankshaft is dragged. In addition, reactions can be carried out in which the energy released by the reaction is not sufficient to ensure autarkic operation of the reciprocating compression reactor apparatus. This is particularly the case with endothermic reactions. In this case, the apparatus is driven by the electric machine. In order to reduce the cost of an electric machine, a combination of a small electric machine (for start-up and to compensate for short-term peaks) and a powerful eddy current or water brake, which take over most of the braking power, can be used when the output power of the compression reactors is high and the associated braking power of the crankshaft is high. In this case, the electric energy produced by the electric machine is naturally much lower, but high heat rates are then produced by the eddy current or the water break which can be used as process heat. In addition to the above-described design as a reciprocating piston machine respectively a reciprocating compression apparatus, a design as a rotary piston reactor respectively machine respectively apparatus can also be implemented according to the invention. For this purpose, the rotor, analogous to the crankshaft, is also coupled to a device, e.g. electric machine, via which the speed of the rotor of the rotary piston reactor respectively machine and thus the residence time in the reaction chambers can be varied. In addition, as already described above, the generation of electrical energy is thus possible.

According to the invention, at least one of the resulting products has a calorific value of at least 12 MJ/kg, advantageously of at least 20 MJ/kg, extremely advantageously of at least 30 MJ/kg. The proportion of the at least one product with a calorific value of at least 12 MJ/kg in the product stream leaving the reactor is at least 5%, advantageously at least 10%, extremely advantageously at least 20%. Advantageously, the process is suitable if the sum of the volumetric calorific values of the products is higher than the sum of the volumetric calorific values of the reactants respectively educts.

Products produced by the reciprocating compression reactor include aliphatic hydrocarbons ($C_2H_2$, $CH_4$, etc.), aromatic hydrocarbons, alkaloids, amino acids, fats, carbon containing heterocycles, $NH_3$, alcohols ($CH_3CH_2OH$, $CH_3OH$, etc.), HCHO, $C_2H_4$, ethers (dimethyl ether (DME), diethyl ether (DEE), polyoxymethylene dimethyl ether (POMDME) etc.), amines, amides, urea, $CS_2$, thiocyanates, carbamate, organic acids (e.g. acetic acid) are considered. For this purpose, one, advantageously at least two, of the following compounds or their derivatives are fed to the reactor chambers of the compression reactors: $N_2$, $H_2$, CO, $CO_2$, aldehydes, in particular HCHO, alcohols, in particular $CH_3OH$ and ethanol, sulfur, $NH_3$.

$CH_4$ can be produced from CO or $CO_2$ and $H_2$ according to the following equations $$H_2 + CO_2 \rightarrow CO + H_2O$$

$$3H_2 + CO \rightarrow CH_4 + H_2O$$

$H_2$ can be produced using electrolysis if electrical energy is available. To increase the yield, unused $H_2$ and $CO/CO_2$ are separated from the resulting product stream leaving the rotary-piston or reciprocating-piston compression reactors downstream and redirected to these reactors. In this way, the emission of the greenhouse gas $CO_2$ from the upstream processes can be avoided and converted into a product that can be reused. In the event that $CH_4$ or the other hydrocarbons formed are burned or fed to an internal combustion engine at a later stage, the process thus enables not only the production of fuel but also the chemical storage of electrical energy, which was used to produce $H_2$ and operate the electric machine. Upstream processes with high $CO_2$ emissions, such as lime burning, internal combustion engines, cement production, steel production, pyrolysis of carbonaceous material, such as plastics, are suitable for this purpose. The same reactants/educts are also used to produce methanol or ethanol, but less hydrogen is added per carbon atom.

$$CO + 2H_2 \rightarrow CH_3OH$$

$$CO_2 + 3H_2 \rightarrow CH_3OH + H_2O$$

$$2CO + 4H_2 \rightarrow CH_3CH_2OH + H_2O$$

$$2CO_2 + 6H_2 \rightarrow CH_3CH_2OH + 3H_2O$$

For ammonia production, $N_2$ and $H_2$ are fed to the compression reactors.

$$N_2 + 3H_2 \rightarrow 2NH_3$$

For ammonium carbamate production, $CO_2$ and $NH_3$ are fed to the reactors.

$$2NH_3 + CO_2 \rightarrow H_2NCOONH_4$$

Urea can then be produced from the ammonium carbamate formed, with elimination of water at a later stage. As described above, it is convenient for this purpose to separate the water from the formed product stream, and to feed this product stream back to the reactors together with the unused ammonium carbamate in order to shift the equilibrium to the right side and increase the yield.

$$H_2NCOONH_4 \rightarrow H_2NCONH_2 + H_2O$$

The yield can be increased further in the presence of excess ammonia. Acetic acid can be produced from the reactants methanol and carbon monoxide. The reaction pressure is at least 30 bar, preferably at least 50 bar, most preferably at least 70 bar. The reaction temperature is between 100° C. and 350° C., preferably between 150° C. and 300° C., most preferably between 150° C. and 250° C.

$$CH_3OH + CO \rightarrow CH_3COOH$$

The reactants/educts for the preparation of other products, such as HCHO, are CO and/or $CO_2$ and $H_2$, for $CH_3OH$ and $CH_3CH_2OH$, CO and/or $CO_2$ as well as $H_2$, for DME, $CH_3OH$, for POMDME, $CH_3OH$ and HCHO, for DEE, ethanol. In order to increase the yield of the reactions described above, it is also provided according to the invention to remove a partial product stream downstream of the reactor chambers and to feed it back to the reactor chambers. The reaction conditions in the reactor chambers for starting the reaction are advantageously at least 50 bar, advantageously at least 60 bar, extremely advantageously at least 70 bar. The reaction temperatures at the start of the reaction are between 200° C. and 500° C., advantageously between 250° C. and 450° C., extremely advantageously between 280° C. and 400° C.

In order to achieve sufficiently high yields in reactions whose yield is negatively influenced by the presence of oxygen, the oxygen concentration at the start of the reaction is at most 1%, advantageously at most 0.5%, extremely advantageously at most 500 ppm. This avoids or reduces oxidation of the products and a reduction in their calorific value.

For safety reasons, it is advisable to feed reactive or combustible reactants, such as hydrogen, ethanol, $CH_4$ or methanol, directly upstream of the inlet to the reactor chamber, i.e. downstream of the non-combustible reactants, such as CO, $CO_2$ or $N_2$, or directly into the reactor chamber via a valve independent of the inlet valve. In this case, the reactor inlet and outlet valves are advantageously closed. This direct feed is also ideal for liquid reactants/educts.

The compression ratio of the piston reactors is at least 1:8, advantageously at least 1:15, extremely advantageously at least 1:20. The residence time of the reactants in the reactor chamber is at most 10 s, advantageously at most 1 s, extremely advantageously at most 0.1 s.

The crankshaft is surrounded by a so-called crankcase and fastened to the reactor walls by screws. The seals used at the joints are static seals, which ensures a significantly better seal to the outside than the dynamic seals on the pistons. However, these dynamic seals of the piston at the liner of the reactor chamber are still a critical point, as reactants can enter the crankcase via them. In conjunction with the oxygen present in the environment, this can lead to the formation of explosive mixtures, such as oxyhydrogen gas, and consequently to an explosion or deflagration in the crankcase. If toxic reactants or products are used, such as formaldehyde, these can leach into the environment, which should also be prevented. According to the invention, this is prevented by flushing the crankcase with non-flammable and non-toxic or low-toxic reactants, such as $N_2$, CO and/or $CO_2$, which are then fed to the reactor chamber. A further improvement can be achieved if the crankcase or the reactants and products contained therein are sucked out so that a lower pressure is established than in the environment. The at least one flammable or toxic reactant and/or product is then also introduced upstream of the reactor chamber or, preferable, directly into the reactor chamber via a valve independent of the inlet valve, advantageously closing both the reactor inlets and outlets.

In order to additionally raise the pressures in the reactor chamber, it is useful to feed the reactants to the reactor chamber already at elevated pressure. In the simplest case, this can be done via compressors, but a turbocharger arrangement makes more sense in terms of energy, especially for exothermic reactions: Here, enthalpy is extracted from the heated product stream via a turbine located downstream of the reactor chambers and transferred via a shaft to a compressor on the reactant/educt side. The pressure on the reactant side and thus ultimately the pressure in the reactor chamber can be varied by suitable measures, such as discharge or bypass valves on the reactant and/or product side, variable turbine and/or compressor geometries. The device can be designed as a two-stroke or four-stroke apparatus. The following description refers to, but is not limited to, a reactor chamber and an exemplary design as a reciprocating piston compression reactor or apparatus with the crankshaft mounted below the pistons.

Two-Stroke Apparatus:
1. intake and compression (piston moves upward)
2. main reaction and expulsion/push-out (piston moves downwards)

For this design, valves can, but do not have to, be dispensed with completely, since the piston alternately closes or opens the inlet and outlet.

Four-Stroke Apparatus:
1. intake (intake open, outlet closed, piston moves downward)
2. compression (inlet and outlet closed, piston moves upward)
3. main reaction and expansion (piston moves downwards)
4. expulsion/push-out (outlet open, inlet closed, piston moves upward)

This setup requires inlet and outlet valves at the reactor chambers. These can be driven by at least one camshaft. Additional devices are known from the engine sector by means of which the opening and closing timing of these valves can be varied and are also used here, such as piezo actuators, hydraulic valve trains, adjustable camshafts, etc. These measures can be used to influence the reaction conditions in the reactor chamber. For example, it is possible to open the exhaust valve after the third cycle respectively stroke even before the piston reaches bottom dead center in order to lower the pressure and thus the temperature in the reactor chamber more quickly than would be possible via piston movement alone. In this way, it is possible to freeze the reactions and avoid undesirable side reactions. In addition, the inlet valve can be opened before the top dead center of the piston is reached in the expulsion stroke, in particular before the bottom dead center of the piston is reached, so that products flow back to the reactant/edcut side respectively the inlet side. As a result, a mixture of products and reactants is sucked in during the next suction stroke, which increases the yield of products. A similar effect is achieved if the outlet valve remains open during the suction cycle respectively stroke, so that products are drawn back into the reactor chamber.

Four-Stroke+2*X Apparatus:

This is a further development of the four-stroke apparatus. In order to increase the yield and/or selectivity and/or conversion rate, the outlet valve is not opened in the fourth cycle respectively stroke, but at least one more compression and reaction cycle respectively stroke is added.

1. intake/suction (intake open, outlet closed, piston moves downwards)
2. compression 1 (inlet and outlet closed, piston moves upwards)
3. main reaction 1 and expansion 1 (piston moves downwards)
4. compression 2 (piston moves upwards)
5. main reaction 2 and expansion 2 (piston moves downwards)
. . . repeat the compression and main reaction cycle respectively stroke x times
6+2*x: expulsion/push-out (outlet open, inlet closed, piston moves upwards)

x is an element of the natural numbers, so that in total cycle respectively stroke numbers of 6, 8, 10 etc. result. It is often useful to add at least one reactant for the second main reaction. This can be done, for example, by opening the inlet valve or directly adding at least one further reactant via an additional feed device into the reactor chamber. On the one hand, it is possible to feed one of the reactants that has already been fed in the first main reaction, which on the one hand can increase the yield and/or the selectivity.

However, it is also possible to feed at least one reactant that is different from the reactants in the first main reaction, whereby a different product than in the first main reaction can be selectively produced. The addition can be done, for example, by opening the inlet valve and sucking it into the reactor chamber or directly adding at least one reactant via an additional feeding device into the reactor chamber.

Irrespective of the number of cycles, the yield can be further increased by removing a partial product stream downstream of the reactor chamber and returning it to the reactor chamber, in particular on the inlet side, i.e. the reactant side. The amount of product recirculated in this way can be varied by means of suitable actuators, such as valves and/or blowers. This is particularly useful for equilibrium reactions and/or reactions with volume increase, as it allows the equilibrium to be shifted towards the product side. Another way to increase the yield is to separate unconsumed reactants and/or undesired byproducts from the product stream and feed them back to the reactors. The reaction can also be influenced by the temperature of the reactants fed to the reactor chamber. For example, the yield of endothermic reactions or reactions with volume increase can be raised if the temperature of the reactants is increased before they enter the reaction chamber. This temperature increase can be accomplished in an energy-efficient manner by thermally coupling the reactant stream to the product stream downstream of the reactor chambers and/or to the cooling medium of the compression reactor. The cooling medium is necessary to prevent overheating of the apparatus. In addition, for exothermic reactions, such as methane production from CO or $CO_2$ and $H_2$, or ammonia production from $N_2$ and $H_2$, cooling of the reactants is useful.

Another advantage of the process according to the invention is that the compression reactors can be used as compressors and conveyors for the resulting products. For this purpose, the outlets of the reactors are connected to at least one pressure vessel and/or a downstream process, in particular a process requiring a raised pressure. In the push-out cycle respectively stroke of the compression reactors, the resulting products are pushed out of the reactor and fed to the pressure vessel. I.e. the reactor works at the same time as a piston compressor according to the positive displacement principle. In the best case, an additional compressor or blower for conveying and compressing the product stream respectively the at least one product can be dispensed with, or at least they can be designed to be significantly smaller. In exothermic reactions, the energy required for this purpose is provided from the chemical reaction, so that no conversion to another form of energy, such as electrical energy, is necessary. That's the reason, why the efficiency of the method and apparatus according to the invention is significantly higher than that of separately operating chemical flow or fixed-bed reactors and compressors. If the energy from the reaction is not sufficient, the conveying of the products or their compression can be carried out with the help of mechanical energy, which is transferred to the crankshaft via the electric machine.

Since, as described above, the start of the reaction often cannot be initiated in a defined manner solely via the pressures and temperatures prevailing in the reactor chambers and/or the temperatures would have to be raised so much that this would have a negative effect on the selectivity, according to the invention additional energy is supplied to the reactor chamber in the short term in addition to the compression energy in order to exceed the activation energy and thus start the reaction. This can be done via at least one of the following methods or devices: electrical spark (especially via a spark plug), corona discharge, microwaves or laser pulse. To further increase the input of energy into the reactor chamber, a small separate ignition reactor chamber can be used, which is connected to the main reactor chamber via openings. In this chamber, a different gas composition is usually selected than in the main reactor chamber. For example, an ignitable gas mixture containing oxygen can be provided in this chamber, while the main reactor chamber contains no oxygen or at least significantly less oxygen. The gas mixture contained in the ignition reactor chamber is now ignited, e.g. via a spark plug, and the resulting pressure wave and flame front travel through the openings into the main reactor chamber, where they start the main reaction.

To increase the yield of the process, the product or gas composition is measured downstream of the reactor chamber and corresponding process parameters are adjusted via an electronic control device. If, for example, the yield is too low, the following parameters can be adjusted: The speed of the crankshaft is lowered, i.e. the residence time in the reactor is raised, reactant pressure is raised (for reactions with volume reduction), reactant pressure is lowered (for reactions with volume increase), amount of product recycled to the reactant side and/or recycled unconsumed reactant amount is raised, the inlet valve is opened before the outlet valve is opened, causing the products to flow to the reactant side, the additional energy supplied to the reactor is raised (e.g. raising the ignition voltage of the spark plug). If the selectivity is too low, the following is possible: speed of the crankshaft is increased, i.e. the residence time in the reactor is lowered, the number of cycles until push-out is lowered, the reactant pressure is lowered, the amount of product returned to the reactant side is lowered, in the intake cycle respectively stroke the inlet valve is closed before reaching bottom dead center, in the expansion cycle respectively stroke the outlet and/or the inlet valve is opened before reaching bottom dead center, the number of additional energy pulses supplied to the reactor is increased and/or the energy of a single pulse of additional energy is lowered (e.g. several laser pulses or ignition sparks).

If $H_2$ is required for the reaction, it can be produced via electrolysis, for example. In order to increase energy efficiency, it is a good idea to resort to high-temperature electrolysis, whereby the thermal energy required for the operation of the electrolyzer is at least partially supplied by thermal coupling to the hot product stream of the upstream plant and/or the compression reactors. For this purpose, water is advantageously evaporated with the aid of the hot product stream and supplied to the electrolyzer at at least 600° C., preferably at least 650° C., extremely preferably at at least 700° C. If the thermal energy of the product stream is not sufficient, the water vapor can be thermally coupled to the $H_2$ and/or $O_2$ stream leaving the electrolyzer. In addition, auxiliary heating is possible.

A reduction of the investment costs on the side of the hydrogen electrolyzer can be achieved, if CO and $H_2O$ are fed to the reaction chamber, so that a water gas shift reaction takes place

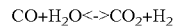

$$CO+H_2O<->CO_2+H_2$$

Based on this process according to the invention, the amount of $H_2$ that has to be produced via electrolysis, for example, can be lowered by about ⅓ when methanizing CO or $CO_2$. In this process, the necessary hydrogen can already be added in parallel with the water. However, in order to increase the yield, it is advisable to add the hydrogen at a later stage. Another possibility is to spatially separate the water gas shift reaction and the methanation, i.e. to let it take place in two different reactor chambers: The water gas shift reaction takes place in a first reactor, and the $CO_2$ and $H_2$ produced there plus the additionally required hydrogen are then fed to the second reactor in which the methanation takes place. The principal advantage of this process, i.e. the separation of different reactions in different reactors, is that different reaction conditions can be set in the different reactors via different process parameters, such as reactant temperatures, compression ratios, reactor pressures, valve control timing (for the inlet and/or outlet valves), timing of additionally supplied activation energies and reactant pressures. In addition, unwanted reactants and products can be separated from the first reactors between the reactors so that only the reactants desired for this reaction are fed to the second reactors. This method is particularly useful in the case of a V-shaped arrangement of the reactor chambers in two rows, so-called banks: For example, the water gas shift reaction can take place on one bank and the methanation on the other. Unused water and/or $CO_2$ can be separated and CO and/or $H_2$ can be added between the two banks. Of course, the process described is not limited to the water gas shift reaction, but can be used for all reactions in which the final product is formed via intermediates. This high degree of flexibility in reaction control clearly distinguishes the process/method and apparatus according to the invention from the prior art: in contrast to heterogeneous catalytically based reaction systems, which can only be used for a very specific reaction due to the solid catalyst used in each specific case, the process parameters as well as the reactants can be varied over a very wide spectrum according to the invention, which enables the production of a wide variety of products from a wide variety of reactants. The selection of the desired product and/or the control of the process is carried out, as already explained, with the aid of an electronic control device. This results in different modes of the process/method and the apparatus to produce different products. For example, in a first mode methane is produced from $H_2$ and $CO_2$, $$4H_2 + CO_2 \rightarrow CH_4 + 2H_2O$$

while in another mode methanol $$CO_2 + 3H_2 \rightarrow CH_3OH + H_2O$$

and in a third mode dimethyl ether (DME)

$$2CH_3OH \rightarrow CH_3-O-CH_3 + H_2O$$

is produced. In this process, the individual reactor chambers can be operated in the same mode or different modes or reaction conditions, as already described above. The different modes differ in the simplest case with respect to the reaction conditions, but can also differ with respect to the reactants. According to the invention, products of one mode can be stored temporarily and used as reactants in at least one further mode (e.g. methanol for the production of DME). According to the invention, the switching between different modes as well as the control and regulation is carried out with the aid of an electronic control device. At least one of the following variables serve as control variables for the control: setpoint product composition, actual product composition, setpoint pressure curve in the reactor chamber, actual pressure curve in the reactor chamber, setpoint maximum pressure in the reactor chamber, actual maximum pressure in the reactor chamber, setpoint pressure rise in the reactor chamber, setpoint residence time in the reactor chamber, setpoint reactant pressure, setpoint reactant temperature, setpoint product temperature, setpoint reactant composition, setpoint pressure rise in the reactor chamber, actual pressure rise in the reactor chamber, actual speed of the crankshaft or of the rotor, actual residence time in the reactor chamber, actual reactant pressure, actual reactant temperature, actual product temperature, actual reactant composition, setpoint speed of the crankshaft or of the rotor, setpoint residence time in the reactor chamber. At least one of the following variables, which can be adjusted via corresponding actuators by the electronic control device, serve as control variables: educt quantities supplied, educt cooler capacity, educt heater capacity, educt pressure regulator, speed of the electric machine, speed of the crankshaft or rotor, energy supplied/dissipated from the electric machine, valve opening timing (inlet valves, outlet valves), valve closing timing (inlet valves, outlet valves), recirculated product quantity, variation of compression ratio, variable turbine geometry, variable compressor geometry, product quantity bypassed the turbine, educt quantity discharged after compressor, position of a throttle valve on the reactant side, position of a backpressure valve on the product side, activation timing of the additional energy supplied via a spark plug, a laser, microwaves or corona discharge, number of activations of the additional energy supplied via a spark plug, a laser, microwaves or corona discharge per operating cycle respectively stroke, timing and number of introduction of the educt supplied directly into the reactor chamber with closed inlet and outlet valves.

One way to further increase yield and selectivity is to arrange at least one catalyst suitable for the particular reaction downstream of the reactor chambers. Since most of the reaction has already taken place in the compression reactors, it can be made much smaller than usual. Using the example of methane production from $H_2$ and $CO_2$ and/or CO, a methanation catalyst is to be installed downstream of the reactor chambers. Nickel, ruthenium, aluminum, cobalt or cerium can be used as active components. In the case of $NH_3$ production from $H_2$ and $N_2$, on the other hand, iron-based catalysts are used. If a turbine is installed downstream of the reactors, the catalysts are advantageously installed upstream of this turbine, since they operate at a higher pressure level at this position.

DESCRIPTION OF SPECIFIC EMBODIMENTS

Figure 10:
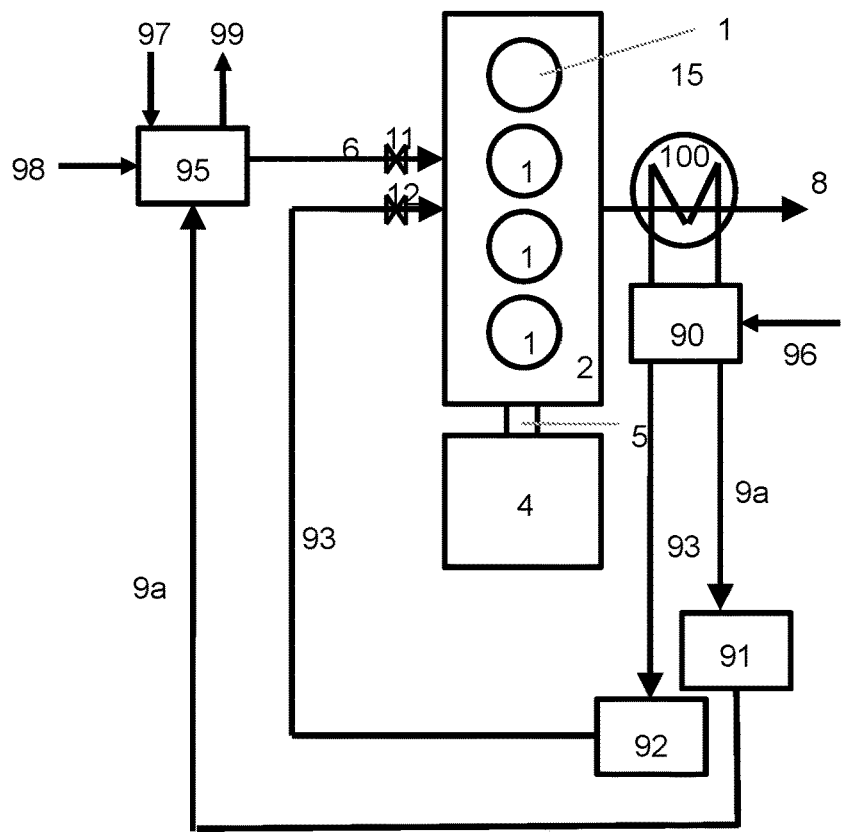
FIG. 10: General overview of the process respectively method

The apparatus and process respectively method according to the invention are explained below with reference to figures. For reasons of clarity, FIGS. 1 to 9 and 11 to 12 deal only with the compression reactors, while FIG. 10 illustrates the overall process and apparatus.

FIG. 1 shows the apparatus with the compression reactors according to the invention. The individual reactor chambers (1) are arranged in series respectively in-line and housed in a common casing. Together they form a pulsed respectively reciprocating compression piston machine (2). An electric machine (4) is connected to a rotatable shaft (5). Via the shaft (5), the compression energy delivered by the reactors or to be supplied to them is transmitted to or from an electric machine (4). The reactants (6) and (7) are fed to the reactors, and the products (8) are discharged from the reactor chambers (1) and collected in a vessel (3). To avoid overheating of the apparatus, it is cooled by a suitable cooling medium, such as water (not shown). In case of formation of several products and/or incomplete conversion of the reactants, a separation of the individual products or a separation of the reactants, e.g. via membrane processes, gas scrubbing, extraction, rectification, adsorption, condensation, is arranged downstream of the apparatus (not shown here). This becomes relevant, for example, when gases are fed in as educts, which result from an oxidation reaction with air, as is the case, for example, with the combustion of hydrocarbons. In this case, CO and $CO_2$ are formed on the one hand, but large quantities of $N_2$ are also present, which do not participate in the combustion. If this mixture is fed to the reaction chamber of the compression reactor together with $H_2$, hydrocarbons are formed, such as methane, but also water and $NH_3$. This $NH_3$ can be advantageously absorbed in water fed in a column in countercurrent or co-current flow at temperatures below 30°, preferably below 20° C., extremely preferably below 15° C. This water is then discharged and heated to expel the $NH_3$ again, thus "regenerating" the water so that it can absorb $NH_3$ again. It is then cooled and returned to the product stream to absorb more $NH_3$.

The water produced in the reaction is also separated from the hydrocarbons in this way and it has to be removed from the process, since otherwise the amount of water carried in the circulation would increase.

The amount of heat required for the desorption of ammonia can be applied by thermally coupling the desorption to the product stream upstream of the scrubber and/or to the reactor cooling medium.

The compression reactors can be used to produce methane as product (8) by adding $CO_2$ and/or CO as reactants, as well as $H_2$. For safety reasons, it is useful to purge the crankcase (32), as shown in FIGS. 3a,b,c, with a non-flammable, non-toxic reactant, in this case $CO_2$ (see below).

Furthermore, the production of ammonia is possible by using nitrogen and hydrogen as reactants. Here, purging the housing (32) with nitrogen is useful. Simultaneous production of $NH_3$ and $CH_4$ is also possible, as already described above, by feeding $CO_2$ and/or CO as well as $H_2$ and nitrogen to the reactors. The apparatus and process according to the invention are not limited to these compounds, but can be used in all reactions in which no solid reaction products, in particular no abrasive reaction products, are formed. These include, as already described above, but are not limited to $NH_3$, HCHO, $CS_2$, thiocyanates (including ammonium thiocyanate), dimethyl ether (DME), diethyl ether (DEE), $CH_4$, POMDME, alcohols (methanol, ethanol), ammonium carbamate, urea, acetaldehyde, acetic acid.

FIG. 2 shows a reciprocating compression reactor according to the invention based on the four-stroke principle: At least two reactants (6, 7) are fed into the reactor chamber (1) via at least one inlet valve (33). The reactants are drawn in and compressed via a piston (34), which is connected to the crankshaft (37) via a connecting rod (35) and moves up and down in a cylinder, and the products (8) are then expelled. The reactants can be fed to the reactor collectively via the inlet valve, as shown in FIG. 2. Particularly in the case of flammable, reactive or explosive substances, such as methanol, ethanol or $H_2$, it is advisable for safety reasons to feed them directly into the reactor chamber via a separate feeding device, especially if the reactor inlets and outlets are closed, or at least to add them directly upstream of the inlet valve (not shown here) to prevent any reaction or explosion taking place inside the inlet piping.

Compression results in an increase in temperature and pressure, which induces the desired reaction. The start of the reaction can also be initiated, or precisely controlled or regulated, by adding additional energy, e.g. in the form of a spark, laser pulse, corona discharge or microwave radiation (not shown here) at very specific timing. To avoid leakage of reactants and products into the environment, the piston and the crankshaft are surrounded by a housing (32) which is sealed off from the environment by means of static seals (36). To prevent large quantities of reactants and products from entering the housing (32) past the piston, the latter is sealed off from the liner in which it moves up and down by means of dynamic seals (39). Since it is nevertheless unavoidable that reactants and products penetrate into the housing (32), it is provided in accordance with the invention, in the event that explosive or corrosive substances are involved, that the housing (32) is flushed with a non-corrosive, non-flammable or non-explosive reactant and this is then fed to the reactor chamber (1) (not shown). The at least one inlet and/or outlet valve can be controlled via camshafts, hydraulically or piezoelectrically. Especially the last two variants are to be preferred if a precise control of the reaction conditions is to be represented, since the valve opening timing can be freely selected.

According to the method of the invention, the control and regulation is carried out with the aid of an electronic control device respectively an electronic control device. At least one of the following variables, their setpoint and actual values, serve as input variables for the control: product composition, pressure curve in the reactor chamber, maximum pressure in the reactor chamber, pressure rise in the reactor chamber, speed of the crankshaft, residence time in the reactor chamber, reactant pressure, reactant temperature, product temperature, reactant composition, reactant quantity. Actuators or controlled variables are at least one of the following and being controlled by the electronic control device: Educt quantity, educt cooler rating, educt heater rating, educt pressure controller, electric machine speed, crankshaft speed, energy supplied/discharged from the electric machine, valve opening timing (inlet valves, outlet valves), recirculated product quantity, variation of compression ratio, variable turbine geometry, variable compressor geometry, product quantity bypassed the turbine, educt quantity discharged after compressor, position of the throttle valve on the educt side, position of the backpressure flap on the product side, activation timing and duration of the additional energy supplied via a spark plug, a laser, microwaves or corona discharge, number of activations of the additional energy supplied via a spark plug, a laser, microwaves or corona discharge per operating cycle respectively stroke, timing and number of feeds of the reactant fed directly into the reactor chamber via a separate feeding device with the inlet and outlet valves closed.

In particular, the pressure curve, the maximum pressure and the pressure rise gradient within the reactor chambers have proven to be important process variables. These variables can be determined with the aid of pressure sensors fluidically connected to the respective reactor chamber and corresponding evaluation in the electronic control device. In addition to their influence on conversion and selectivity, these variables are also important for avoiding mechanical overloading of the compression reactors. To ensure that no overloading occurs, the electronic control device limits their values. This is achieved in particular by reducing the quantities of reactant supplied and/or lowering the quantity of reaction-accelerating reactant and/or lowering the reactant temperatures and/or reactant pressures and/or the compression ratio and/or increasing the quantity of product recycled to the reactant side and/or shifting the additional activation energy supplied via spark plugs, for example, to later points in time. Particularly critical in this context is an uncontrolled, very fast and early start of the reaction, especially if it takes place well before top dead center. These uncontrolled reactions can lead up to detonations in the reactor chamber, which place a very high mechanical and thermal load on the components of the compression reactors. In addition to the determination of this condition by means of the pressure sensors described above, which are connected to the respective reactor chamber, it is also possible to determine the uncontrolled, impact-like reactions by means of structure-borne sound sensors, in particular by means of piezoelectric longitudinal elements, and acceleration sensors which are arranged outside the reactor chambers on the apparatus according to the invention. In addition it also possible to detect the change in the rotating speed of the crankshaft by rotating speed and/or acceleration sensors. All these signals are evaluated in an electronic control device and compared with expected values. If an uncontrolled reaction is detected, the countermeasures already described above can be initiated via the electronic control device.

In addition to preventing mechanical damage due to excessive reactor pressures or excessive pressure rise gradients, the pressure and/or structure-borne sound and/or acceleration sensors and/or rotating speed sensors described above can also be used to detect a reaction that is too slow or the complete absence of a reaction. In these cases, the yield would drop significantly and a large amount of unreacted reactants respectively educts would reach the product side. In this case, the electronic control device would raise the supplied reactant quantities and/or the reactant temperatures and/or reactant pressures and/or the compression ratio and/or reduce the product quantity returned to the reactant side and/or increase the additional activation energy supplied via, for example, spark plugs, and/or shift the timing of the additional activation energy and/or the addition of reactant introduced directly into the reactor chamber with closed inlet and outlet valves to an earlier timing and/or increase the number of additionally supplied activation events, such as electric sparks, and/or increase the number of reactant additions made directly into the reactor chamber and/or the amount of additionally supplied activation energy.

The problem of the reaction being too slow or completely absent occurs in particular at the start of the compression reactors, since their reactant-contacted components and in particular the reactor chambers are still cold at this time. This can lead to the setpoint reaction temperatures not being reached. To avoid this, when starting the compression reactors, it is provided in accordance with the invention that they are operated in a dragged mode before all reactants are fed to the reactor chambers. As described above, this is achieved in the simplest case with the aid of an electric motor coupled to the crankshaft of the reciprocating compression reactors. In addition, the invention provides for preheating the coolant and/or the lubricant of the reciprocating compression reactors before a start. Furthermore, until the operating temperature or the desired product composition is reached, a valve arranged downstream of the reactor chambers and downstream of the line for returning the products to the reactant side is closed and the line for returning the products to the inlet, i.e. reactant/educt side, is opened. Due to the friction and the resulting frictional heat, the temperature in the reactor chambers increases, and the return of the heated fluids to the inlet side further intensifies this effect. Independently or in addition to this, not all reactants required for the desired reaction are added yet, but preferably inert substances, in particular reactants such as $N_2$ or $CO_2$. This is particularly useful when explosive reactants are added in the actual reaction, since this flushes the reactor chambers and removes any oxygen that may have entered during the shutdown. It is particularly advantageous to add gases with positive Joule-Thomson coefficients to the reactor chambers before the operating temperature is reached, since with these gases the temperature increases due to compression in the reactor chambers, which warms up the reactor chambers. The addition of gases with negative Joule-Thomson coefficients, such as hydrogen, is dispensed with during this operating phase. In addition, preheating of the reactants is possible. If the electronic control device determines a sufficiently high temperature for the reaction, it switches from this warm-up mode to the actual standard operation to generate the desired products. That is, all reactants are now added, the valve downstream of the reactor is opened, and the amount of product or reactants returned to the reactant side is adjusted to the desired product composition. For a detailed illustration, especially regarding the valve downstream of the reactor (88, 88*a*), please refer to FIG. 4.

The purging of the crankcase is illustrated for the case of a two-stroke apparatus in FIGS. 3*a, b, c*, but is not limited to this: according to the invention, in the first stroke (FIG. 3*a*), the non-corrosive, non-flammable or non-explosive reactant (7), such as $CO_2$ and/or $N_2$, is fed into the housing (32) via a valve or flap. This flows past the piston into the reactor chamber (1). The at least second reactant (6) is added into the reactor chamber (1) or directly in front of it (not shown here). The upward movement of the piston compresses the reactants (FIG. 3*b*) and initiates the reaction. This can be improved, or precisely controlled or regulated, by using a device (42) for feeding compounds to reduce the activation energy and/or a reactant required for the reaction and/or supplying additional energy, such as a spark plug, a laser pulse, a corona discharge or microwave radiation. In the subsequent ejection stroke (FIG. 3*c*), the products (8) are discharged from the reactor. The supply of additional energy in addition to the compression energy and the separate supply of reactants, which are required for the reaction, or compounds for lowering the activation energy into the reaction chamber is not limited to the two-stroke apparatus, but can also be used in four-stroke or four+2*x apparatuses.

Figure 4:
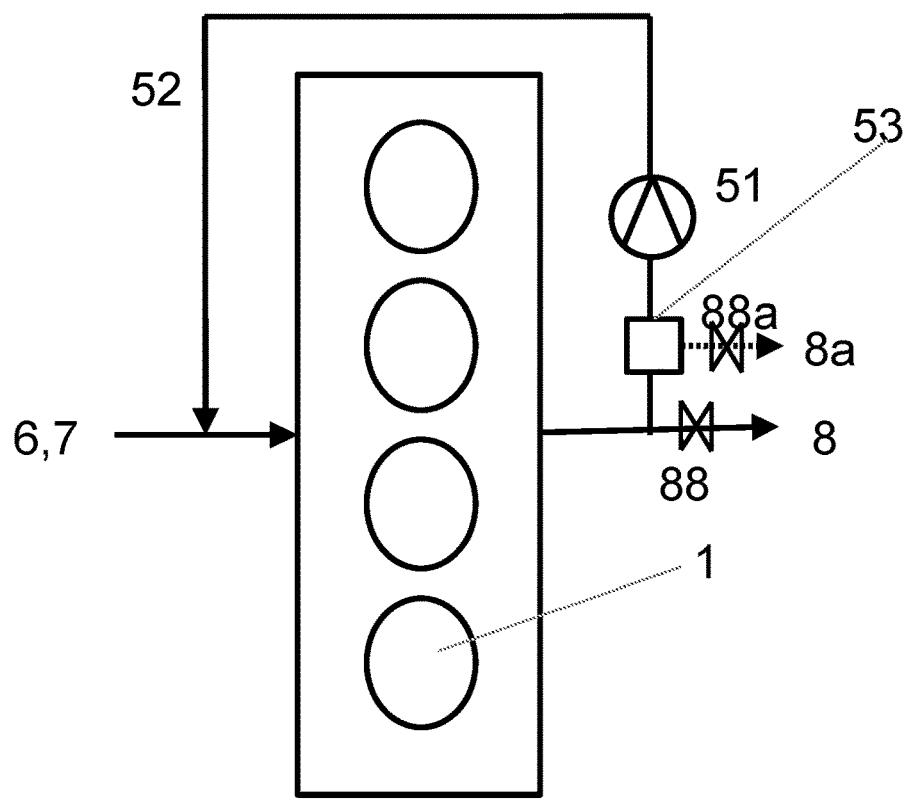
FIG. 4: Apparatus according to the invention with a partial recirculation of products

FIG. 4 shows a modification of the arrangement selected in FIG. 1 for increasing the yield and/or selectivity. Here, a product stream is taken downstream of the reactors and this partial product stream (52), together with the reactants (6, 7), is added to the reactors (1). It can be conveyed by a suitable conveying device (51), such as a compressor or a blower. It is also possible to implement a control of this recirculated product flow with suitable control devices, such as valves or dampers (not shown). In order to further increase the yield or selectivity, it may be useful to selectively discharge products (8*a*) from this stream via a separator device (53). In particular, if the product stream (8) still contains high amounts of reactants or undesired intermediates or byproducts. For example, in the production of methane using CO and/or $CO_2$ as well as $H_2$, this is water that is discharged from the circulation. In addition, $CH_4$ can be discharged so that only unused reactants and unwanted by-products are redirected.

When starting the compression reactors, according to the invention, the valve (88) and, if necessary, the valve (88*a*) are provided to close or at least throttle the flow over them so that the amount of recycled partial product stream (52) is raised to warm up the compression reactors as described above. For a detailed description of the start-up procedure, please refer to the description of FIG. 2.

Figure 5:
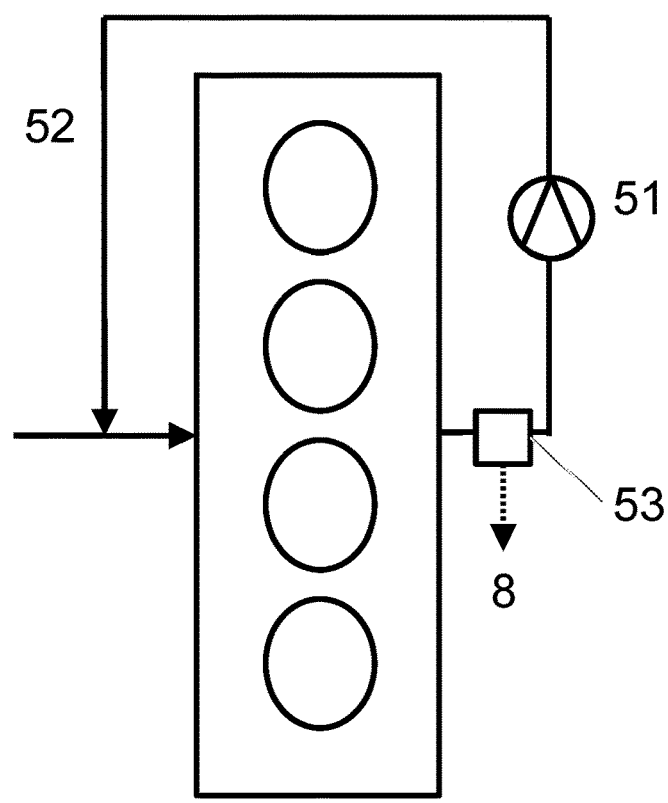
FIG. 5: Apparatus according to the invention with a partial recirculation of products

A similar setup is shown in FIG. 5, but in this case the separator (53) is located in the main product stream, so that the separation of the product is implemented for the entire product stream.

Figure 6:
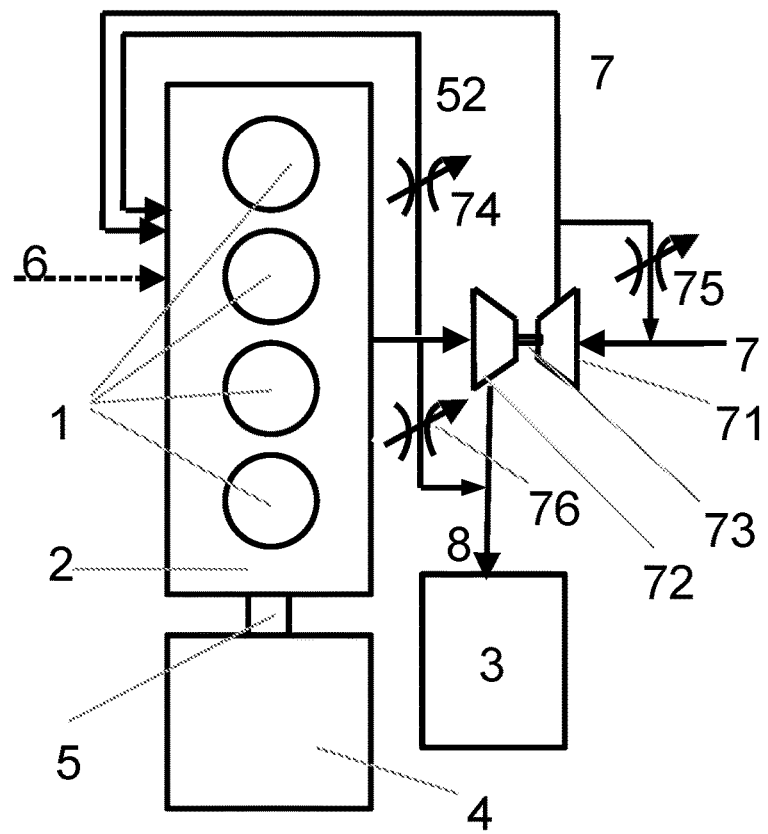
FIG. 6: Embodiment for raising the reactant pressure via a compressor

FIG. 6 shows an embodiment for increasing the reactant/educt pressure via a compressor (71). The compressed reactant (7) is then fed to the reactors. The at least second reactant (6) can be added to the reactant (7) upstream of the compressor (not shown), or added directly upstream of the reactors or directly into the reactors via a valve independent of the inlet valve. The compressor (71) is connected in a turbocharger setup via a shaft (73) to a turbine (72), via which the product stream (8) is expanded from a high to a lower pressure. The energy released in this process is thus largely used again for compressing the reactants, thus increasing the efficiency of the process. The reactant pressure and thus the pressure in the reactor chambers can be varied by suitable devices, such as blowing off the reactant from the high-pressure to the low-pressure side of the compressor via a suitable control element (75) (compressor bypass), blowing off the product from the high-pressure to the low-pressure side of the turbine via a suitable control element (76) (turbine bypass), variable turbine geometry and/or a variable compressor geometry. Moreover, in order to further raise the pressure, the compressor can additionally be driven electrically and/or another compressor can be arranged within the reactant stream. In this embodiment, it is also advantageous if the system design is such that the pressure on the educt side is lower than on the product side, since this allows product that is returned to the educt side

(52) to flow to the educt side without a conveying device, such as compressors, blowers or pumps. The quantity can thereby be varied or controlled via a variable throttle device (74) and an electronic control device. According to the invention, it is provided that at least the temperature of a reactant or of the product redirected to the reactor is controlled or regulated by means of an electronic control device and coolers or heaters.

Figure 7:
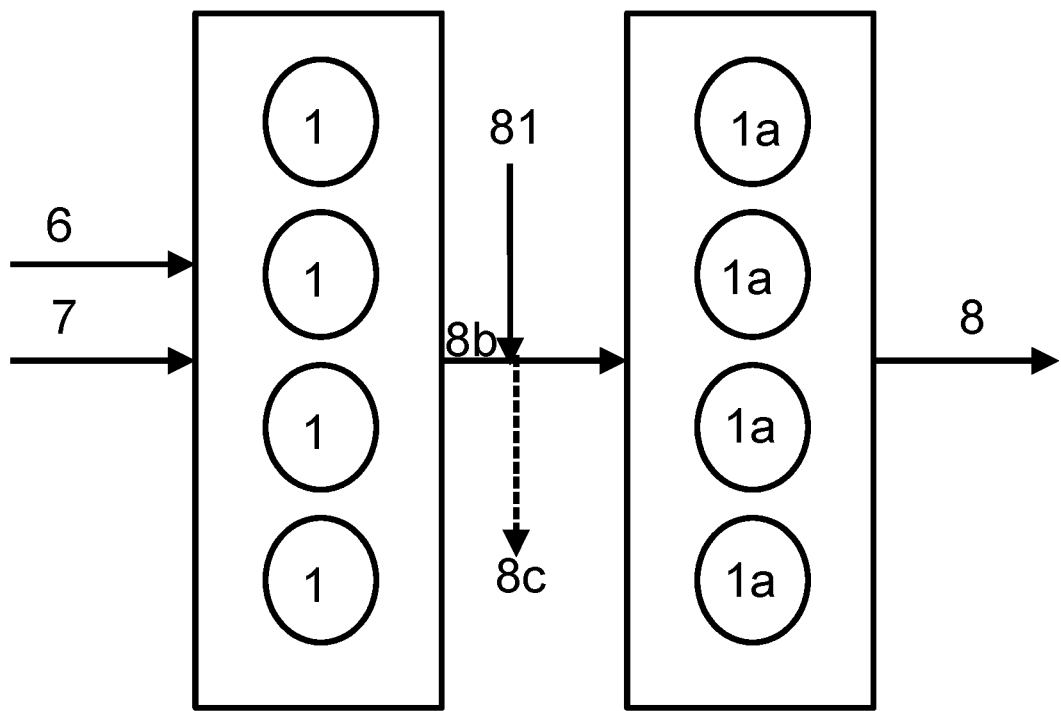
FIG. 7: Series arrangement of reactor chambers in respect to flow
Figure 8:
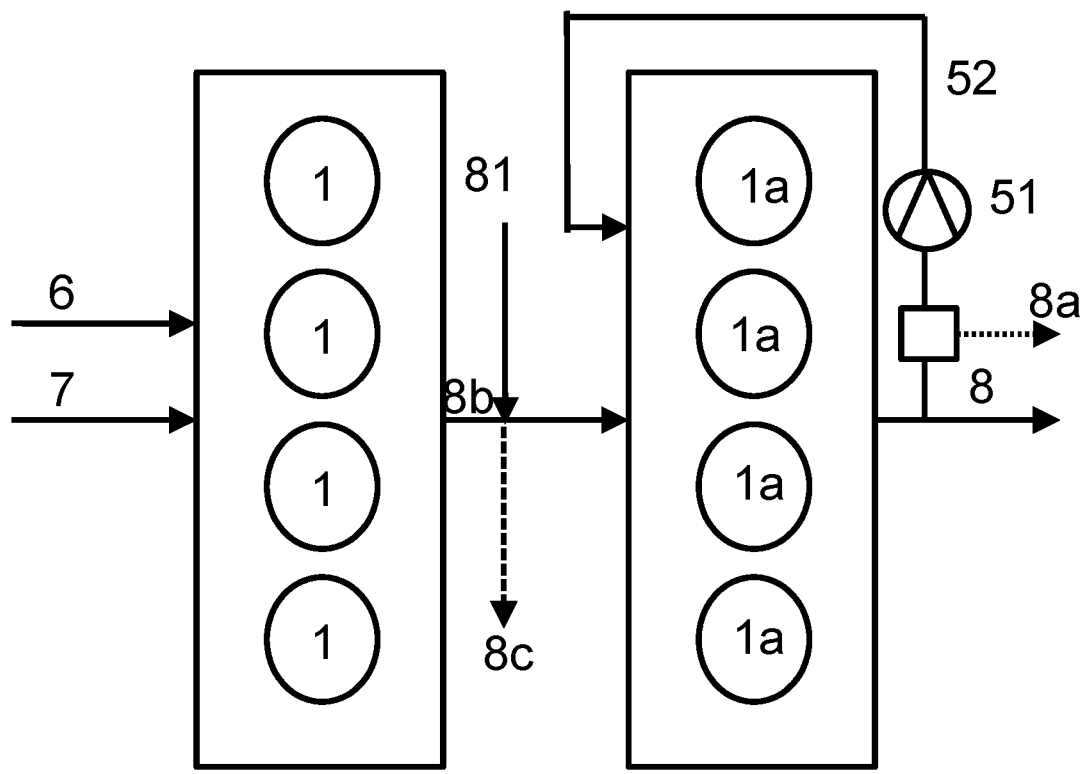
FIG. 8: Series arrangement of reactor chambers in respect to flow and partial recirculation of products
Figure 9:
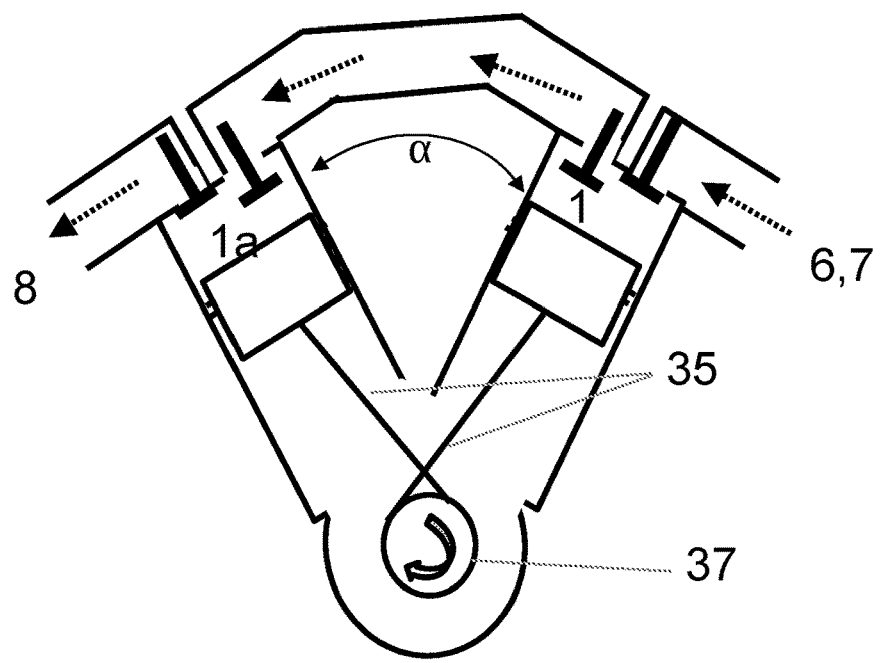
FIG. 9: Series arrangement of reactor chambers in the form a V-shape apparatus

FIGS. 7 and 8 show a series arrangement of several compression reactors (1) and (1a). The reactors (1) and (1a) can differ in their geometry, such as piston geometry, diameter and/or stroke, or in their operating parameters, such as temperature, pressure and/or additional energy supplied. This makes it possible to further process an intermediate product (8b) leaving the first reactors (1) with modified reaction conditions, resulting in the final product (8). Between the two reactors, another reactant (81) can be fed and/or an intermediate product (8c) can be discharged.

For example, methanol can be produced from $CO_2$ and $H_2$ in the first reactors (1), $$CO_2 + 3H_2 \rightarrow CH_3OH + H_2O$$

while in the second reactors (1a) dimethyl ether (DME) can be formed from methanol (8b) with release of $H_2O$.

$$2CH_3OH \rightarrow CH_3-O-CH_3 + H_2O$$

Between the two reactors, an intermediate, in this case $H_2O$, is removed from the product stream of the first reactor respectively reaction (8c). This serves to shift the equilibrium to the side of DME. This can be further improved if the water formed in the second reactor is removed from the product stream (8a) and this anhydrous product stream (52) is redirected to the reactor chambers (1a) (FIG. 8). The two reactor rows can be designed as separate independent units, i.e. separate piston machines, in the event that different residence times are to be realized in the two reactor rows; however, according to the invention, it is also possible to arrange both rows of reactors in such a way that their pistons act on a common crankshaft (37) via the connecting rods (35). This is particularly useful if the residence times in the two reactor rows are to be identical. To ensure this, the two rows are arranged in a V-shape relative to each other, the angle of the two legs being marked as "a" in FIG. 9.

FIG. 10 shows the overall process consisting of an apparatus or plant (95) in which at least gaseous carbonaceous products are produced with the carbon oxidation state of at least −2 and downstream compression reactors (1). The apparatus in which at least gaseous carbonaceous products are produced (95) is advantageously an apparatus or oven for burning lime (calcination) or for cement production or for steel production or for pyrolysis or waste incineration. In the following, the process is illustrated by means of the production of CaO and cement by burning lime or lime and clay. For this purpose, $CaCO_3$, or in the case of cement, $CaCO_3$ and clay, are added (98) to the apparatus in which at least gaseous carbonaceous products are produced (95). The materials are then heated to above 750° C. (CaO) or to above 1250° C. (cement), whereby $CO_2$ is being released and CaO or cement is formed:

$$CaCO_3 \rightarrow CaO + CO_2$$

The solids (99) formed are then discharged from the apparatus.

The temperature required for the reaction is usually achieved by adding and burning coal and/or by burning hydrocarbons (97), which further increases the $CO_2$ content. This is exemplified by the following equation using methane and coal as fuels.

$$CH_4 + 2O_2 \rightarrow CO_2 + 2H_2O$$

$$C + O_2 \rightarrow CO_2$$

The oxygen necessary for the combustion is usually provided by blowing in air. The nitrogen contained in the air is oxidized to nitrogen oxides in small proportions, but for the most part does not participate in the reaction and leaves the apparatus in which at least gaseous carbonaceous products are produced (95) again. I.e., the gaseous material flow (6) leaving the device in which at least gaseous carbonaceous products are produced (95) would contain $N_2$ and $CO_2$, as well as traces of $NO_x$ and CO, if air were used.

In addition to the components already described in FIG. 1, a device (90) for splitting water (96) into hydrogen (93) and oxygen (9a) using electrical energy is also shown. This splitting of water is illustrated using an electrolyzer (90). In addition a high temperature electrolyzer may be used to improve yields. To increase its efficiency, it can be thermally coupled (100) to the product stream (8) leaving the pulsed compression reactor (1, 1a) and/or to the product stream (6) leaving the apparatus for producing carbon containing compounds (95) and/or to the cooling fluid of the reciprocating machine (2). The water (96) required for this electrolyzer can be supplied externally. It is also possible to use water formed as product in the reactor chambers (1, 1a) and/or in the apparatus for producing carbon containing compounds (95). According to the invention, the water is heated by means of the product streams leaving the apparatus respectively reactor in which at least gaseous carbonaceous products are produced (95) and/or the compression reactors (1) and supplied to the electrolyzer (not shown). For this purpose, water is vaporized by means of the hot product streams (6 and/or 8) and fed to the electrolyzer at at least 500° C., preferably at least 550° C., most preferably at least 600° C. If the thermal energy of the product stream is not sufficient, the water vapor can be thermally coupled to the $H_2$ and/or $O_2$ stream leaving the electrolyzer. In addition, auxiliary heating is possible. In the case where the reactors drive an electric machine operating as a generator, the electrical energy thus generated can be fed to the electrolyzer to improve the overall efficiency.

The process according to the invention is described below using the example of a process for $CH_4$ production. The hydrogen (93) leaving the electrolyzer is fed to the reactor chambers (1) together with the CO and/or $CO_2$ (6) formed in the apparatus in which at least gaseous carbonaceous products are produced (95), whereby $CH_4$ and $H_2O$ are formed and leave the reactors (8). Subsequently, the water is separated from the $CH_4$ (not shown here) and at least the $CH_4$ formed is collected. The oxygen (9a) formed by the electrolysis can be collected in a tank (91) and subsequently fed to other processes. In the case shown, the oxygen (9a) is fed to the apparatus respectively oven in which at least gaseous carbonaceous products are produced (95) for the oxidizing reactions taking place there, like the oxidation of the fuel (97). By doing this the addition of air can be omitted, giving the benefit that no nitrogen is introduced into the process. This has several advantages: First, the gaseous material flow is reduced, which means that less energy is required for heating the device (95). Before the product stream (6) leaving the apparatus in which at least gaseous carbonaceous products are produced (95) enters the compression reactor chambers (1), it must be cooled down again (not shown). Due to the reduced material flow, the coolers required for this can be designed smaller. Since no nitrogen oxides are formed due to the lack of nitrogen, their reduction downstream of the process can be dispensed with. Therefore no SCR catalysts are necessary for reducing nitrogen oxides, which would otherwise have been formed in the first apparatus respectively oven in which at least gaseous carbonaceous products are produced (95).

Since the formation of $CH_4$ from $CO_2/CO$ and $H_2$ is highly exothermic, the rotational speed of the crankshaft would increase continuously due to the energy supplied. This is prevented by the electric machine (4), which counteracts this. The generated electrical energy can be fed to the electrolyzer (90), which significantly improves the overall efficiency of the process. This represents a further advantage over the prior art, since in fixed-bed reactors this energy is converted into heat but not into mechanical or electrical energy. The use of the exotherm of the reaction as mechanical or electrical energy is not limited to the reaction described above. Ammonia can be produced in the same way as methane, but instead of carbon monoxide or carbon dioxide, nitrogen (6) is fed to the reaction chambers along with hydrogen (93). Parallel formation of methane and ammonia is also possible if both nitrogen and CO and/or $CO_2$ as well as hydrogen are fed to the reactor chambers (1). This is the case, for example, as already described above, if air is used instead of oxygen (9a) for the process respectively combustion in the apparatus in which at least gaseous carbonaceous products are produced (95). Downstream of the reactor chambers (1), ammonia is separated via absorption, adsorption or membrane processes. This parallel production of ammonia and methane illustrates the major difference between the catalytic flow or fixed bed reactors and the process according to the invention: Unlike flow and fixed-bed reactors, in which the two substances have to be fed to two different catalysts with separate reactant feeds and thus produced in two separate plants or steps, according to the process of the invention this is achieved without catalysts and in a single apparatus (2). This significantly reduces both installation space and costs. In addition, no time-consuming gas separation on the reactant side, which is otherwise common, is necessary.

A further advantage of the process according to the invention is that when air is used for the process in the apparatus in which at least gaseous carbonaceous products are produced (95), the NOx formed in this process is reduced in the downstream compression reactors (1) with the aid of added hydrogen (93) and ammonia formed in the reactors via a selective non catalytic reduction, resulting in reduced NOx emissions of the overall process.

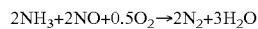

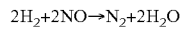

As a result, in contrast to the state of the art, no catalytic SCR system needs to be installed downstream of the reactor (95) to reduce NOx emissions.

In all three cases, the oxygen content in the reactor chambers (1) must be minimized at the beginning of the reaction in order to achieve high selectivities for the desired products methane and ammonia, respectively.

The hydrogen (93) produced in the electrolysis can be temporarily stored in a tank (92).

Figure 11:
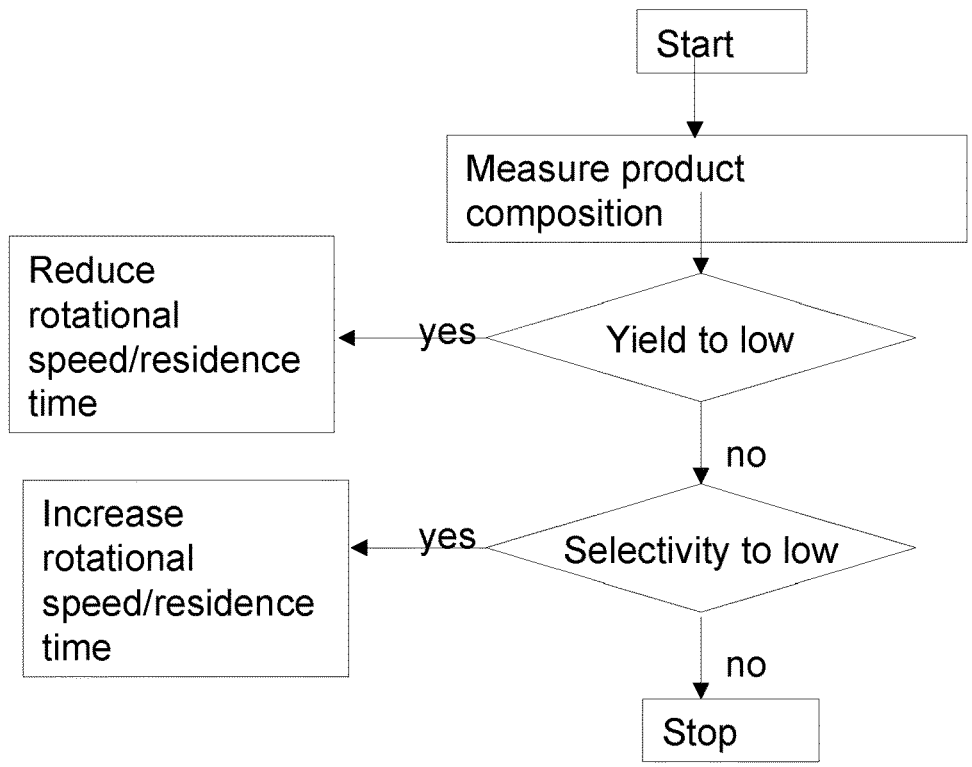
FIG. 11: Flowchart of the electronic control device program to optimize yield and selectivity

FIG. 11 shows the control of the compression reactor according to the invention with the aid of an electronic control device, using the example of the control of the rotational speed of the crankshaft and thus the residence time. In general, this control unit evaluates corresponding sensors for determining the reactant and product states, such as temperature, pressure and flow sensors as well as structure-borne sound, acceleration or speed sensors of the electric machine or the crankshaft, in order to represent a closed control loop. In addition, the pressure curve and/or the rate of pressure rise and/or the maximum pressure within the reaction chambers can be detected by the control unit using pressure sensors. According to the invention, it is further provided to determine the product composition also by means of corresponding sensors, such as $NH_3$, $CO_2$, CO, $CH_4$ sensors and/or by means of analyzers, such as gas chromatographs, IR, UV, FID analyzers, FTIR and/or mass spectrometers. If the yield determined in this way is too low, the rotational speed is lowered to increase the residence time. If, on the other hand, the selectivity is too low, the rotational speed is increased to lower the residence time. As described above, other process parameters, such as recycled product amount, reactant pressures, reactant temperatures, product temperatures, product pressures, variable compression ratios, timing of additionally supplied activation energy, amount of additionally supplied activation energy, number of additionally supplied activation energy per cycle respectively stroke, reactant amounts, valve timing (for inlet and/or outlet valves), timing of reactant supplied directly into the reactor chamber, crankshaft speed, electric machine speed, temperature of recycled product, etc., are also suitable to control the reactor (not shown here), in order to influence the reaction to the desired extent with the aid of the electronic control device and suitable actuators.

Figure 12:
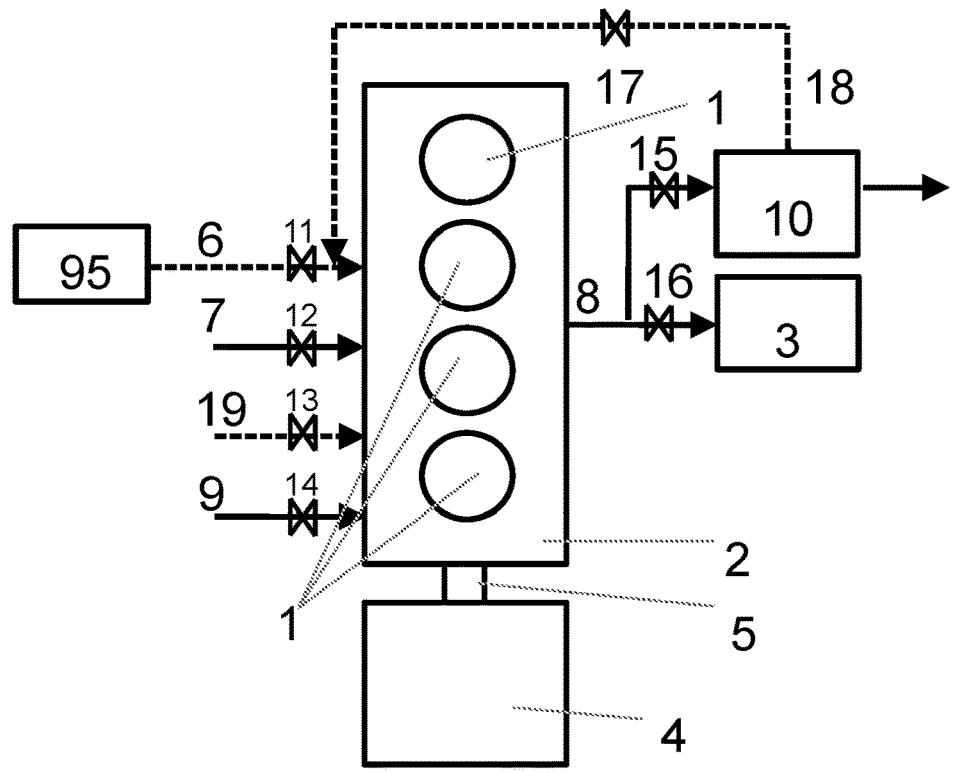
FIG. 12: Compression reactor according to the invention, which can be operated in at least two different modes to produce different products

FIG. 12 shows the compression reactor (2) according to the invention, which can be operated in at least two different modes to produce different products from different reactants respectively educts, and the associated process. The individual reactor chambers (1) are arranged in-line and housed by a common casing. Together they form a reciprocating apparatus respectively reactor (2). Via a shaft (5), the compression energy delivered by the reactors or to be supplied to them is transmitted to or from an electric machine (4). In a first mode, reactants (6) and (7) are supplied to it via the open valves (11) and (12) and discharged to a container (10) via the valve (15). In this mode at least one of the reactants is produced in the apparatus in which at least gaseous carbonaceous products are produced (95). The valves (13), (14), (17), (16) are closed in this mode. In the case of integration of the compression reactor into a process in which $CO_2$ is produced as an educt, such as in cement production, steel production, lime burning, waste incineration or pyrolysis of carbonaceous material or an internal combustion engine, $CO_2$ (6) and $H_2$ (7) are supplied to the compression reactors via valves (11) and (12). The $CH_4$ formed is collected in the vessel (10). In the second mode, the valves (11), (12) and (15) are closed and valves (13), (14) and (16) are opened. As a result, the reactants (9) and (19), which are different from the reactants of the mode one (6, 7) are fed to the reactors, and the products, which also differ from the products of mode one, are discharged from the reactor chambers (1) and collected in a second vessel (3). The reactants, which are fed to the reactor chambers (1, 1a) in mode two, may be, but are not limited to $N_2$ and $H_2$. In this case, $NH_3$ is being formed.

In general to avoid overheating of the apparatus related to the invention, it is cooled by a suitable cooling medium, such as water.

When several products are formed, a separation of the individual products is arranged downstream of the apparatus, e.g. via membrane processes, gas scrubbing, extraction, rectification, adsorption, condensation (not shown here). This becomes relevant, for example, when gases are fed in as reactants that result from an oxidation reaction with air, such as occurs during the combustion of hydrocarbons in mode one. In this case, CO and $CO_2$ are formed on the one hand, but in addition large amounts of $N_2$ are present which do not participate in the combustion. If this mixture is fed to the reaction chamber together with $H_2$, hydrocarbons are formed, such as methane, but also water and $NH_3$. This $NH_3$ can be easily absorbed and separated from the hydrocarbons formed with the help of water fed in a column in counter-current or co-current flow like described above.

FIG. 12 also shows another possible embodiment according to the invention: In the first mode, at least parts of the product stream are stored in a vessel (10). The remaining product components, on the other hand, are discharged into the environment or another container (not shown). Since the separation of gases and fluids is state of the art, reference is hereby made to these methods. In mode two, the valve (17) is opened and thus the product from mode one is fed to the reactor chambers (1) as reactant in mode two. In the example described above, this means that, for example, in mode two $NH_3$ is formed and collected. In mode one, this is fed to the reactors together with $CO_2$ from an upstream process, advantageously in a ratio of more than 2:1. This results in the formation of ammonium carbamate, which reacts further to form urea with the separation of $H_2O$. The control of the corresponding valves and the regulation of the entire process shown is effected by an electronic control device (not shown here).

In case the apparatus in which at least gaseous carbonaceous products are produced (95) is stopped or deactivated, the compression reactor (2) can also be operated independently from this apparatus by switching to another mode using educts respectively reactants which are different from the educts used in the mode in which the apparatus is operational. As a result the operational hours of the compression reactor (2) can be increased over the operational hours of the upstream apparatus and completely different products can be produced from the same compression reactor (2).

In most examples $NH_3$, $H_2$ or $CH_4$ were described above as products, but the method, process and the apparatus are not limited to these products, but can be used for all reactions with gaseous reactants respectively educts or liquid reactants respectively educts which evaporate inside the reaction chambers (1) and non abrasive products.

The invention claimed is:

1. A method for producing hydrocarbons, the method which comprises:
   obtaining at least one reactant, which includes carbon, from an apparatus in which the at least one reactant is formed;
   feeding the at least one reactant, which includes carbon, from the apparatus to at least one reactor positioned downstream from the apparatus, the at least one reactor being at least one rotary piston compression reactor or at least one reciprocating piston compression reactor;
   feeding at least one further reactant to the at least one reactor;
   controlling a residence time in a reactor chamber of the at least one reactor by controlling, with an electric machine, a rotational speed of a rotatable shaft connected to a piston of the reactor chamber, wherein the electric machine is connected to the rotatable shaft;
   wherein the at least one reactor forms aliphatic hydrocarbons or aromatic hydrocarbons or alkaloids or amino acids or fats or carbon containing heterocycles or alcohols or HCHO or $C_2H_4$ or ethers or diethyl ether, polyoxymethylene dimethyl ether or amines or amides or urea or $CS_2$ or thiocyanates or carbamate or organic acids, and/or $NH_3$.

2. The method according to claim 1, which comprises:
determining, with an electronic control device, values selected from the group consisting of: actual values of the reactors, reactants, and products, wherein the electronic control device determines the values using at least one component selected from the group consisting of at least one sensor, at least one mathematical model, and at least one analyzer;
comparing, with the electronic control device, the values with setpoint values stored in the electronic control device; and
changing, with the electronic control device, at least one operating parameter to meet one of the set point values.

3. The method according to claim 1, wherein the at least one reactant, which includes carbon, and which is formed in the apparatus, is $CO_2$.

4. The method according to claim 1, wherein the apparatus, in which the at least one reactant is formed, is selected from the group consisting of: a reactor for producing cement or steel, a reactor for lime burning, a reactor for waste incineration, and a reactor for pyrolysis.

5. The method according to claim 1, which comprises:
raising a reactant pressure upstream of the reactor chamber by at least one compressor connected via a shaft to a turbine driven by a product stream leaving the reactor chamber.

6. The method according to claim 1, which comprises:
downstream of the reactor chamber, removing a component selected from the group consisting of a partial product stream, at least one product, and at least one reactant from a total product stream; and
feeding the component back to the reactor chamber.

7. The method according to claim 1, which comprises:
supplying additional energy to the reactor chamber when reactor inlets and outlets are closed;
wherein the additional energy supplied to the reactor chamber is selected from the group consisting of: electric sparks, corona discharge, laser pulses, and microwaves.

8. The method according to claim 1, wherein:
the at least one reactor is selected to be the at least one reciprocating piston compression reactor; and
the at least one reciprocating piston compression reactor is operated to convey products toward a pressure vessel.

9. The method according to claim 1, which comprises:
using a separate ignition reactor chamber connected to a main reactor chamber via openings; and
igniting a gas mixture contained in the ignition reactor chamber such that a resulting pressure wave and flame front propagates through the openings into the main reactor chamber to initiate a start of a reaction in the main reactor chamber.

10. The method according to claim 1, which comprises:
producing hydrogen and oxygen by splitting water with an electrolyzer; and
performing at least one group of steps selected from the group consisting of:
1) feeding the hydrogen to the reactor chamber, and
2) feeding the oxygen to the apparatus in which the at least one reactant is formed.

11. The method according to claim 1, which comprises:
producing hydrogen and oxygen by splitting water with an electrolyzer; and thermally coupling at least one feature, which is selected from the group consisting of the electrolyzer and water supplied to the electrolyzer, to at least one component selected from the group consisting of a product stream of the at least one reactor and a cooling medium of the at least one reactor.

12. The method according to claim 1, which comprises: obtaining at least one product with a calorific value of at least 12 MJ/kg, and an amount of the at least one product in a product stream leaving the reactor chamber is at least 5%.

13. The method according to claim 1, wherein the at least one reactor includes:
    at least two reactor chambers formed as cylinders; and
    pistons being movable in the cylinders and acting on a common crankshaft via connecting rods.

14. The method according to claim 1, wherein a first reactor chamber and a second reactor chamber of the compression reactors are arranged fluidically one behind another, so that at least one product from the first reactor chamber serves as a reactant for the second reactor chamber.

15. The method according to claim 1, which comprises: changing, with an electronic control device, at least one variable selected from the group consisting of:
    valve opening timings of at least one inlet valve;
    valve opening timings of at least one outlet valve;
    valve closing timings of the at least one inlet valve;
    valve closing timings of the at least one outlet valve;
    timings of a reactant added directly into the reactor chamber;
    a shaft speed;
    a pressure of at least one reactant;
    a temperature of at least one reactant;
    a reactant composition;
    a recycled product quantity;
    a temperature of recycled products;
    a number of strokes;
    a compression ratio;
    a timing of an additionally supplied activation energy;
    an energy quantity of the additionally supplied activation energy; and
    a number of additionally supplied activation energies per stroke.

16. The method according to claim 1, wherein the at least one reactor is operated in a mode greater than one and in a manner selected from the group consisting of:
    as a two-stroke machine;
    as a four-stroke machine; and
    as a four+2*x-stroke apparatus operating in four+2*x operation in which a third stroke of the apparatus is followed by a number x of compression and expansion strokes before products are pushed out of the reactor chamber, wherein X is a natural number.

17. The method according to claim 1, which comprises:
arranging a first reactor chamber and a second reactor chamber one behind another such that there is a flow from the first reactor chamber to the second reactor chamber; and
performing at least one step selected from the group consisting of:
    1) supplying at least one reactant downstream of the first reactor chamber and upstream of the second reactor chamber, and
    2) extracting at least one product downstream of the first reactor chamber and upstream of the second reactor chamber.

18. The method according to claim 1, which comprises:
during a start-up of the compression reactors, driving the reactors by the electric machine;
wherein not all reactants used for a desired reaction are introduced into the reactor chamber until a sufficient temperature for the desired reaction is reached.

19. A plurality of apparatuses, comprising:
an apparatus forming at least one reactant including carbon;
an apparatus for producing hydrocarbons, the apparatus for producing hydrocarbons located downstream from the apparatus forming the at least one reactant including carbon, the apparatus for producing hydrocarbons including at least one reactor being fed with the at least one reactant including carbon from the apparatus forming the at least one reactant including carbon, the at least one reactor including reactor chambers, and the at least one reactor being at least one rotary piston compression reactor or at least one reciprocating piston compression reactor;
a rotatable shaft connected to the at least one reactor; and
an electric machine configured for controlling a residence time in the reactor chambers of the at least one reactor by controlling a rotational speed of the rotatable shaft connected to a piston of the reactor chamber, wherein the electric machine is connected to the shaft;
wherein the hydrocarbons, which are produced by the apparatus for producing hydrocarbons, are aliphatic hydrocarbons or aromatic hydrocarbons or alkaloids or amino acids or fats or carbon containing heterocycles or alcohols or HCHO or $C_2H_4$ or ethers or diethyl ether, polyoxymethylene dimethyl ether or amines or amides or urea or $CS_2$ or thiocyanates or carbamate or organic acids, and/or $NH_3$.

* * * * *